United States Patent [19]

Paquet et al.

[11] Patent Number: 5,369,137
[45] Date of Patent: Nov. 29, 1994

[54] FLEXIBLE BIMODAL FOAM STRUCTURES

[75] Inventors: Andrew N. Paquet; Kyung W. Suh, both of Granville, Ohio

[73] Assignee: The Dow Chemical Company, Midland, Mich.

[21] Appl. No.: 230,185

[22] Filed: Apr. 20, 1994

Related U.S. Application Data

[63] Continuation of Ser. No. 161,946, Dec. 3, 1993, which is a continuation of Ser. No. 52,855, Apr. 26, 1993, abandoned, which is a continuation of Ser. No. 895,970, Jun. 9, 1992, abandoned.

[51] Int. Cl.$^5$ .................................................. C08J 9/12
[52] U.S. Cl. ...................................... 521/146; 264/53; 521/79; 521/81; 521/99
[58] Field of Search ............... 521/79, 81, 146, 99; 264/53

[56] References Cited

U.S. PATENT DOCUMENTS

| | | | |
|---|---|---|---|
| 4,048,208 | 9/1977 | Spicuzza, Jr. et al. | 264/45.3 |
| 4,048,272 | 9/1977 | Spicuzza, Jr. | 264/45.3 |
| 4,098,941 | 7/1978 | Johnson | 428/218 |
| 4,446,253 | 5/1984 | Hahn et al. | 521/79 |
| 4,455,272 | 6/1984 | Schubert et al. | 264/53 |
| 4,559,367 | 12/1985 | Hurps et al. | 521/79 |
| 4,636,527 | 1/1987 | Suh et al. | 521/79 |
| 4,916,166 | 4/1990 | Suh et al. | 521/98 |
| 4,990,542 | 2/1991 | Motani et al. | 521/79 |
| 5,011,866 | 4/1991 | Suh | 521/97 |
| 5,064,874 | 11/1991 | Motani et al. | 521/146 |

FOREIGN PATENT DOCUMENTS

0353701A2  7/1990  European Pat. Off. ........ C08J 9/00

*Primary Examiner*—Morton Foelak
*Attorney, Agent, or Firm*—J. Robert Dean, Jr.

[57] ABSTRACT

Disclosed is a flexibilized, insulative styrenic polymer foam structure comprising a foam of a polymeric composition of a styrenic polymer greater than 50 percent by weight styrenic monomeric units, the foam having relatively larger primary cells with an average cell size range of about 0.05 to about 1.2 millimeters and relatively smaller secondary cells ranging in cell size from about 5 percent to about 50 percent of the average cell size of the primary cells. The primary and secondary cells constitute at least about 90 percent of the total cell volume within the foam structure. Between 1 and 30 percent by number of the cells have microscopic "pinholes" between them. The presence of the pinholes enhances the flexure of the foam structure. Further disclosed is a method of insulating a surface comprising applying to the surface an insulating panel fashioned from the structure of claim 1.

6 Claims, No Drawings

FLEXIBLE BIMODAL FOAM STRUCTURES

CROSS-REFERENCE TO RELATED APPLICATIONS

This application is a Rule 1.60 continuation of copending application Ser. No. 08/161,946, filed Dec. 3, 1993, which is a Rule 1.62 continuation of application Ser. No. 08/052,855, filed Apr. 26, 1993, now abandoned, which is a Rule 1.62 continuation of application Ser. No. 07/895,970, filed Jun. 9, 1992, now abandoned.

The invention relates to a bimodal styrenic polymer foam structure having enhanced flexural characteristics.

BACKGROUND OF THE INVENTION

A foam structure with a bimodal cell size distribution has a distribution of relatively larger primary foam cells and relatively smaller secondary foam cells. Most conventional foam structures have a unimodal or primary cell size distribution only. Various foam structures with bimodal cell distributions are seen in U.S. Pat. Nos. 4,455,272 and 4,559,367 and in European Patent Application 89114160.8.

Bimodal foam structures offer advantages over conventional unimodal foam structures. The advantages include greater toughness and enhanced insulating capability. Further, bimodal structures are typically made using water as a blowing agent component and unimodal structures typically are not. Since use of water as a blowing agent component is desirable for environmental reasons the manufacture of bimodal structures is similarly desirable.

A disadvantage of bimodal foam structures is their lack of flexibility. It would be desirable to have a bimodal foam structure which offers the enhanced toughness and insulating capability of a bimodal foam structure yet offers enhanced flexibility.

SUMMARY OF THE INVENTION

According to the present invention there is a flexibilized, insulative styrenic polymer foam structure comprising a foam of a polymeric composition of a styrenic polymer of greater than 50 percent by weight of styrenic monomeric units. The foam has relatively larger primary cells with an average cell size range of about 0.05 to about 1.2 millimeters and relatively smaller secondary cells ranging in average cell size from about 5 percent to about 50 percent of the average cell size of the primary cells. The primary and secondary cells constitute at least about 90 percent of the total volume of the foam structure. The primary and secondary cells have pinholes between 1 and 30 percent by number of the total number of such cells. The presence of the pinholes enhances the flexibility of the foam structure versus a corresponding foam structure without pinholes.

Further according to the present invention, there is a process for making a styrenic polymer foam structure comprising: a) heating a styrenic polymer material comprising greater than 50 percent by weight styrenic monomeric units to form a melt polymer material, b) incorporating into the melt polymer material at an elevated pressure a blowing agent in liquid or gaseous form comprising at least about 3 weight percent water based upon the total weight of the blowing agent to form a foamable gel, and c) expanding the foamable gel at reduced pressure to form the foam structure. Preferably, the foamable gel is expanded by extruding it through a die into a zone of lower pressure to form the foam structure.

Further according to the present invention there is a cushioning or insulating medium comprising a plurality of discrete foamed particles of the above-described structure.

DETAILED DESCRIPTION

The foam of the present foam structure is comprised of relatively larger primary foam cells with an average cell size range of about 0.05 to about 1.2 millimeters and relatively smaller secondary foam cells ranging in cell size from about 5 percent to about 50 percent of the average cell size of the primary cells. Cell size is determined by the optical microscopy method typically employed in the art in analyzing and characterizing bimodal foam structures. The relatively larger cells in the cell distribution are averaged to determine the average cell size of the primary cells, and the relatively smaller cells in the cell distribution are averaged to determine the average cell size of the secondary cells. The secondary cells may be situated within the cell walls or struts of the primary cells, or may be situated outside of or adjacent to the primary cells individually or in groups of two or more. A strut is a juncture of three or more cell walls. Preferably, the primary cells are generally dispersed throughout the secondary cells such that the foam of the present foam structure has a generally heterogeneous dispersion of the two cell types throughout. Additional teachings directed to plastic foams with bimodal cell distributions are seen in U.S. Pat. Nos. 4,455,272 and 4,559,367 and in European Patent Application No. 89114160.8, which are incorporated herein by reference.

In contrast to the bimodal foams described in the aforementioned prior art references the foam of the present structure has "pinholes" between a portion of the foam cells. The pinholes are microscopic holes defined within cell walls between contiguous primary cells, contiguous secondary cells, or contiguous primary and secondary cells. The pinholes do not materially affect the closed-cell nature of the foam as defined by ASTM D-2856 because the pinholes are present between only a relatively small proportion or portion of the foam cells. The pinholes are preferably present at between 1 and 30 percent by number and more preferably at between 5 and 20 percent by number of the total number of primary and secondary foam cells.

Bimodal foams with pinholes exhibit a greater degree of flexibility than corresponding bimodal foams without pinholes. The greater flexibility results in foam structure that is less brittle and easier to process and fabricate and handle during use without suffering breakage. Greater flexibility also provides greater resistance to cracking when used in stucco applications.

The foam of the present foam structure is preferably at least 90 percent closed-cell according to ASTM D-2856. Such closed-cell foams are particularly efficacious in insulative applications.

The primary and secondary cells constitute at least about 90 percent and preferably at least 95 percent of the total cell volume within the foam structure. Cells larger than the primary cells and smaller than the secondary cells should constitute only a relatively small proportion (less than about 10 percent) of the volume displaced to ensure that the desired bimodal distribution of cell sizes will be present in the structure. Voids or cavities present in the foam structure not in the nature of a foam cell are not considered part of the total cell volume within the foam structure.

The present structure comprises at least 50 and more preferably at least 80 percent by weight of a styrenic polymer. The term styrenic polymer is inclusive of polymers derived from one or more alkenyl aromatic compounds such as styrene, methylstyrene, ethylstyrenes, vinyl benzene, chlorostyrenes, and bromostyrenes. Minor amounts (i.e. <5 percent by weight) of copolymerizable compounds such as $C_{1-4}$ methacrylates and aerylates, acrylic acid, methacrylic acid, maleic acid, acrylonitrile, maleic anhydride, and vinyl acetate may be incorporated into the styrenic polymer.

The styrenic polymer material may contain other thermoplastic materials as long as the styrenic polymer comprises greater than 50 weight percent of alkenyl aromatic monomeric units. Suitable plastic materials may be selected from any which can be blended with the styrenic polymer and blown into a foam. Suitable plastics include polyolefins, polyvinylchloride, polystyrene, rubber-modified styrenic polymers, cellulosic polymers, polycarbonates, polyamides, polyesters, polyvinylidene chloride, and the like. Suitable polyolefins include polyethylene, polypropylene and polybutylene. Preferred structures comprised substantially (i.e. greater than 95%) and most preferably entirely of polystyrene, because polystyrene insulating plastic foam.

The present structure may contain additional additives such as pigments, fillers, antioxidants, extrusion aids, nucleating agents, stabilizing agents, antistatic agents, fire retardants, acid scavengers, or the like.

The foam component of the present structure preferably has density of about 16 to about 80 kilograms per cubic meter.

The present foam structure is generally formed by melting and mixing the styrenic polymer itself or with other polymers if present to form a plastic melt, incorporating a blowing agent into the plastic melt to form a foamable gel, and extruding the foamable gel through a die to form the foamed structure. During melting and mixing, the polymers are heated to a temperature at or above the glass transition temperature and preferably above the melting point of the polymer. Melting and mixing of polymers and any additives is accomplished by any means known in the art such as with an extruder, mixer, or blender. Likewise, the blowing agent, including water, is incorporated or blended into the plastic melt by any of the same above-described means. The blowing agent is blended with the plastic melt at an elevated pressure sufficient to prevent substantial expansion of the resulting plastic gel or loss of generally homogeneous dispersion of the blowing agent within the gel. The blowing agent is incorporated into the melt in a weight proportion of between about 1 to about 30 parts and preferably from 3 to 15 parts per hundred parts of the polymer to be expanded. The foamable gel is preferably passed through a cooler or cooling zone to lower the gel temperature to an optimum foaming temperature. For polystyrene, typical optimum foaming temperatures range from 110° C. to 135° C. The cooled gel is then passed through the die into a zone of reduced pressure to form the foam structure.

The blowing agent utilized to prepare the present structure comprises at least about 3 weight percent water based upon the total weight of the blowing agent. The water fraction of the blowing agent must also comprise at least about 0.3 parts per hundred by weight based upon the weight of the styrenic and non-styrenic polymers in the present structure. The necessary water fractions refer to blowing agent which is incorporated in liquid, vapor, or gaseous form directly into the plastic or polymer melt by external means such as injection into an extruder, mixer, or blender and not by water-carrying or water-generating solids incorporated into the plastic or polymer melt as in the prior art. The use of proper fractions of water in the blowing agent added to the polymer melt externally in liquid or vapor form and proper selection of foaming temperature results in a foam structure having the desired bimodal cell size distribution with pinholes. The present invention does not preclude the incorporation of water-carrying or water-generating solids into the polymer melt, but water incorporated by means of such solids is not believed to be critical to pinhole formation; this, water incorporated by means of such solids is not considered in calculation of proper water fractions of blowing agents incorporated into the polymer melt in liquid or vapor form. Proper selection of foaming temperature ensures a fine, homogeneous dispersion of water in the foamable gel.

Blowing agents which may be utilized in combination with water include inorganic agents, volatile organic agents, and chemical agents which decompose into a gas or other byproducts. Suitable gaseous blowing agents include, but are not limited to nitrogen, carbon dioxide, air, and argon. Suitable volatile organic agents include halogenated and nonhalogenated aliphatic hydrocarbons. Suitable nonhalogenated aliphatic hydrocarbons include $C_{1-9}$ alkenes and alkanes such as n-butane, isobutane, n-pentane, ethane, propane, isopentane, n-hexane, and isohexane. Suitable halogenated aliphatic hydrocarbons include methyl chloride, ethyl chloride, perfluoromethane, chlorotrifluoromethane, dichlorodifluoromethane, trichlorofluoromethane, difluoromethane, perfluoroethane, 1-chloro-1,1-difluoroethane, 1,1-difluoroethane, 1,1,1,2-tetrafluoroethane, 1,1,1-trifluoroethane, pentafluoroethane, chlorotetrafluoroethane, 2-chloro-1,1,1,2-tetrafluoroethane chloropentafluoroethane, dichlorotetrafluoroethane, trichlorotrifluoroethane, perfluoropropane, chlorheptafluoropropane, dichloropropane, difluoropropane, dichlorohexafluoropropane, perfluorobutane, chlorononafluorobutane, and perfluorocyclobutane. Suitable chemical blowing agents include azodicarbonamide, azodiisobutyronitrile, benzenesulfonhydrazide, 4,4-oxybenzene sulfonylsemicarbazide, p-toluene sulfonyl semicarbazide, barium azodiearboxylate, N,N'-dimethyl-N,N'-dinitrosoterephthalamide, and trihydrazino triazine.

Preferred blowing agents are those using a combination of water and an inorganic blowing agent such as nitrogen, carbon dioxide, or argon. A most preferred blowing agent comprises water and carbon dioxide. The blowing agent comprises from about 3 to about 80 weight percent water and preferably between about 5 and about 60 weight percent water based upon the total weight of the blowing agent.

Though the preferred process for making the present structure is an extrusion process, it is understood that the above structure may be formed by expansion of beads, which may be molded at the time of expansion to form structures of various shapes. Insulating panels formed from molded, expandable beads are commonly referred to as bead board.

The present foam structure may be used to insulate a surface by fashioning the structure in the form of a panel and applying it to the surface. Such panels are useful in any conventional insulating applications such as roofing, buildings, refrigerators, etc.

According to the present invention, the present foam structure may be formed into a plurality of discrete foamed particles for conventional loose-fill cushioning and packaging applications.

The following is an example of the present invention, and is not to be construed as limiting. Unless otherwise indicated, all percentages, parts, or proportions are by weight.

EXAMPLE

In the example below, a polystyrene foam structure of the present invention was prepared according to the present invention. The structures were tested for their insulating capability ("R" value) and mechanical response in the compressive and flexural modes.

General purpose polystyrene resin of about 200,000 molecular weight as determined by size exclusion chromatography and other additives to control processing and cell nucleation were fed to a 2½ inch (6.4 centimeter) extruder and intimately blended with a blowing agent mixture to form a foamable gel. The blowing agent was a mixture of 4 parts per hundred (pph) carbon dioxide and 0.5 pph water based on resin weight. The gel was cooled to a foaming temperature of 127° C., and extruded through a die to form the polystyrene foam. The tables summarize measured foam physical properties and mechanical tests. R value was measured according to ASTM C518-85. Additive concentrations were 0.05 pph talc, 0.05 pph calcium stearate, 0.05 magnesium oxide, 0.1 polyethylene, and 0.01 pph blue colorant based upon weight of the resin.

Compressive strength tests were carried out according to the methods of ASTM D 1621-79, and flexural tests were made according to ASTM C 20391. Measurements were made on an Instron 4204 Materials Testing System.

The cellular morphology of the foam structure was bimodal, a distribution of primary and secondary cells. Pinholes were present in cell walls of a portion of the primary cells. FIG. 1 illustrates a representative view of the cellular morphology of the foam structure.

The results of the mechanical tests demonstrated an enhanced degree of flexibility and toughness not typically exhibited in bimodal foam structures. This enhancement was due to the presence of pinholes in the cellular structure of the foam structure.

TABLE 1

| Foam Structure Physical Properties | | | |
|---|---|---|---|
| Density #/ft3 | Cell Size mm | Open Cell % | R-value/in measured (°F. ft2 · hr/btu · in) |
| 2.22 | 0.62 | 5.3 | 3.81 |

TABLE 2

| Mechanical Test Results for the Foam Structure | | | | | | | |
|---|---|---|---|---|---|---|---|
| | Compressive Mode | | | | Flexural Mode | | |
| Test Direction | $\sigma_Y$ (psi) | $\epsilon_Y$ (%) | $E_Y$ (psi) | T (in-#/in3) | $\sigma_P$ (psi) | $\epsilon_P$ (%) | $E_F$ (psi) |
| vertical | 72.32 | 3.74 | 4171 | 8.55 | — | — | — |
| extruded | 46.52 | 3.91 | 2086 | 5.57 | 105.3 | 10.12 | 3283 |
| horizontal | 23.50 | 3.46 | 1008 | 3.04 | — | — | — |

$\sigma_Y$ is the stress at yield.
$\epsilon_Y$ is the strain at yield.
$E_Y$ is the compressive mode modulus.
T is the foam toughness up to the break point.
$\sigma_P$ is the stress at the peak of the flexural stress-strain curve.
$\epsilon_P$ is the strain at the peak stress.
$E_F$ is the flexural mode modulus.

While embodiments of the foam structure of the present invention have been shown with regard to specific details, it will be appreciated that depending upon the manufacturing process and desired physical properties, the present invention may be modified by various changes while still being fairly within the scope of the novel teachings and principles herein set forth.

What is claimed is:

1. A flexible styrenic polymer foam structure, comprising: a foam of a polymeric composition of greater than 50 percent by weight of a styrenic polymer, the foam having relatively larger primary cells with an average cell size range of about 0.05 to about 1.2 millimeters and relatively smaller secondary cells ranging in cell size from about 5 percent to about 50 percent of the average cell size of the primary cells, the primary and secondary cells constituting at least about 90 percent of the total volume of the foam structure, the primary and secondary cells having pinholes between 1 and 30 percent by number of the total number of primary and secondary cells.

2. The structure of claim 1, wherein a portion of the secondary cells are located partially or completely within the cell walls and struts of the primary cells.

3. The structure of claim 1, wherein the average cell size range is 0.1 to 0.5 millimeters for the primary cells.

4. The structure of claim 1, wherein the foam is at least 90 percent closed cell.

5. The structure of claim 1, wherein the primary and secondary cells have pinholes between 5 and 20 percent by number of the total number of primary and secondary cells.

6. A cushioning or insulating medium, comprising a plurality of discrete foamed particles of the structure of claim 1.

* * * * *